United States Patent [19]

Naert

[11] Patent Number: 4,632,454
[45] Date of Patent: Dec. 30, 1986

[54] VEHICLE SEAT INTENDED, FOR EXAMPLE, FOR SUCH AUTOMOBILE VEHICLES AS CARS, TRAINS AND AIRPLANES

[75] Inventor: Michel S. Naert, Västra Frölunda, Sweden

[73] Assignee: AB Volvo, Goteborg, Sweden

[21] Appl. No.: 666,223

[22] Filed: Oct. 29, 1984

[30] Foreign Application Priority Data

Nov. 9, 1983 [SE] Sweden ............................ 8306169

[51] Int. Cl.⁴ .............................................. A47C 7/46
[52] U.S. Cl. .................................... 297/284; 297/460
[58] Field of Search ............... 297/284, 410, 437, 460, 297/284; 108/144

[56] References Cited

U.S. PATENT DOCUMENTS

| | | | |
|---|---|---|---|
| 1,182,854 | 5/1916 | Poler | 297/284 |
| 1,522,282 | 1/1925 | Beach et al. | 108/144 X |
| 3,463,544 | 8/1969 | Froelich | 297/284 |
| 4,153,293 | 5/1979 | Sheldon | 297/284 |
| 4,182,533 | 1/1980 | Arndt et al. | 297/284 |
| 4,295,681 | 10/1981 | Gregory | 297/284 |
| 4,309,058 | 1/1982 | Barley | 297/460 X |
| 4,465,317 | 8/1984 | Schwarz | 297/284 |
| 4,469,374 | 9/1984 | Kashihara et al. | 297/284 |

FOREIGN PATENT DOCUMENTS 0011396 5/1980 European Pat. Off. .
2112277 7/1983 United Kingdom .

Primary Examiner—William E. Lyddane
Assistant Examiner—José V. Chen
Attorney, Agent, or Firm—Young & Thompson

[57] ABSTRACT

The invention relates to a seat intended, for example, for automobiles, trains or airplanes, having a back-rest, in which there is arranged a lumbar-support device whose rigidity can be adjusted by turning a wheel mounted on a shaft journalled in the back-rest, and the vertical setting of which can be adjusted by vertically displacing the wheel with subsequent pivoting of the shaft. The lumbar support device comprises a horizontally elongated sheet of flexible material that is bodily vertically displaceable by vertically displacing the wheel, and whose rigidity is adjusted upon turning the wheel by moving toward or away from each other the opposite horizontal edges of the sheet thereby to cause the sheet to bow outwardly to a greater or lesser extent. Turning the wheel winds a filament on the shaft to effect this latter adjustment.

7 Claims, 1 Drawing Figure

U.S. Patent  Dec. 30, 1986  4,632,454
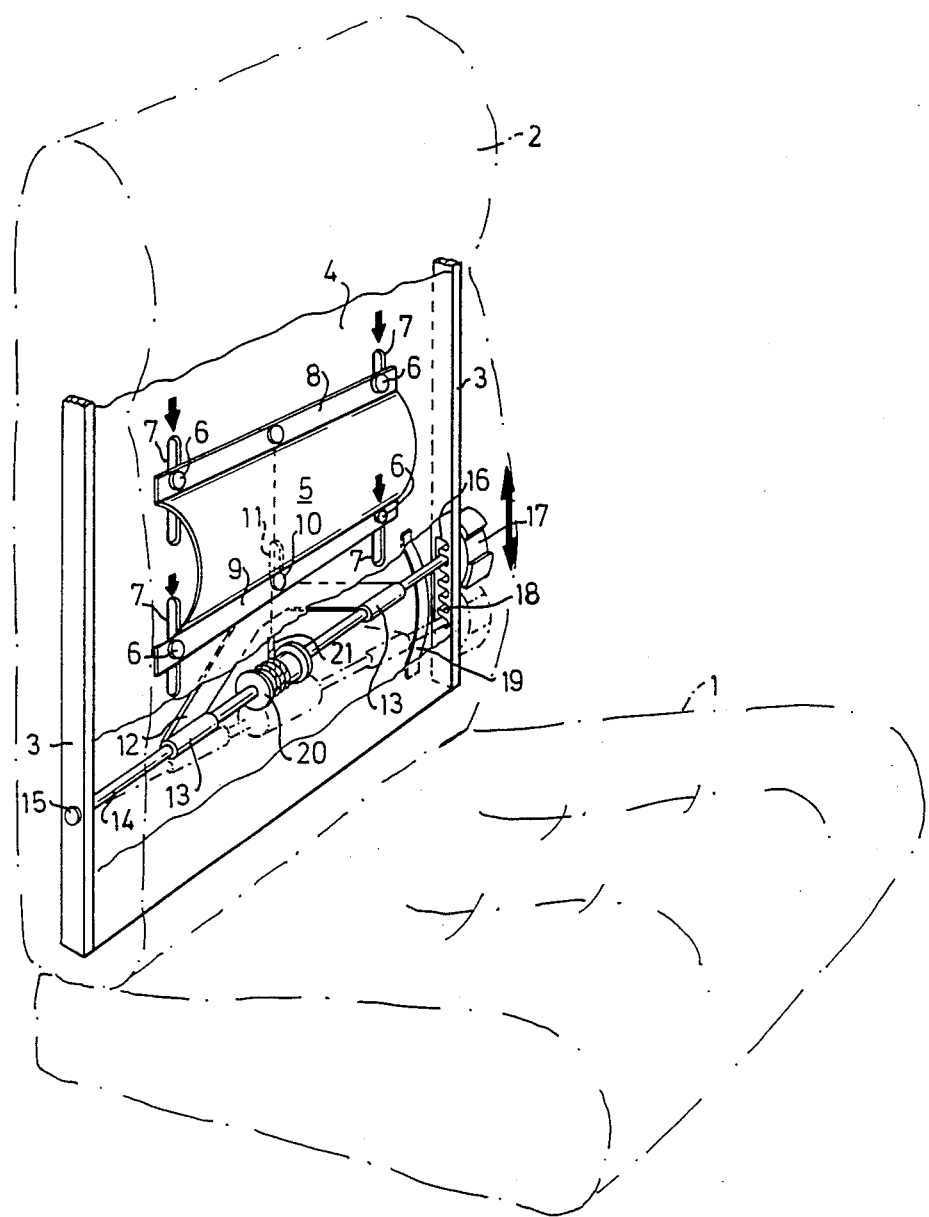

VEHICLE SEAT INTENDED, FOR EXAMPLE, FOR SUCH AUTOMOBILE VEHICLES AS CARS, TRAINS AND AIRPLANES

The present invention relates to a vehicle seat intended for such automotive vehicles as cars, trains and airplanes for example, and comprising a back-rest having incorporated therein a lumbar-support device and means for adjusting the rigidity thereof.

It is known to incorporate in the back-rests of such vehicle seats a lumbar-support device whose rigidity can be adjusted by turning a knob or wheel located on one side of the back-rest, so that the person occupying the seat is able to adjust the degree of rigidity of the lumbar support to that found most comfortable at that time. The importance of ensuring that the lumbar support is precisely positioned in relation to the lumbar region of the seat occupier increases with the degree of rigidity desired. In hitherto known constructions this has meant that the height of the seat occupier and the shape of his/her back have been decisive in determining whether the lumbar support can be used effectively or not. Consequently, the possibilities of utilizing these known lumbar supports to their fullest extent are limited with respect to certain people.

A general object of the present invention is to provide a vehicle seat of the aforedescribed kind which does not possess these limitations.

In accordance with the invention, this is achieved by providing setting means with which the position of the lumbar-support device can be adjusted vertically; and by causing said setting means to co-act with the means for adjusting the rigidity of the lumbar-support device.

In accordance with a further development of the invention, intended to enable a seat occupier to adjust the lumbar-support device to a comfortable position in the simplest fashion, the setting means includes firstly a shaft which is mounted for axial rotation in the back-rest and which has at least one end journalled for movement in a vertical direction, and secondly power-transmission means which are so connected to said shaft that rotation of a wheel mounted on the shaft-end regulates the one setting function, while vertical movement of the wheel regulates the other setting function. As a result of this arrangement, it is possible for the seat occupier to carry out both vertical adjustments and rigidity adjustments to the settings of the lumbar-support device with the aid of one and the same control instrument.

The invention will now be described in more detail with reference to an embodiment thereof illustrated in the accompanying drawing, the single FIGURE of which illustrates schematically a vehicle seat having a lumbar-support device which can be adjusted to selected vertical positions and to selected degrees of rigidity.

In the FIGURE, the reference 1 identifies the seat-part of an automobile seat, while the reference 2 identifies the back-rest thereof. The structural design of the frame, the padding and the springs may be conventional, and need not therefore be described in detail here.

Mounted between two mutually spaced frame beams 3 in the back-rest 2 is a planar plate 4, which lies on the rear side of the padding and springs of the back-rest. Located forwardly of the plate 4 is a lumbar-support device 5, which may have the form of a flexible, elongated rectangular plate made, for example, of sheet metal or plastics material, or may have the form of a metal-net structure. Mounted on each corner of the plate 5 are slide members 6 which slide in vertical slots 7 in the planar plate 4, and are held in said slots by stop elements (not shown) arranged on the rear side of the planar plate 4 and joined with the slide members 6. By moving the upper and lower longitudinal edges of the lumbar-support plate 5 towards and away from one another, said longitudinal edges being strengthened by bars 8,9, it is possible to change the extent to which the plate is bowed forwardly with respect to the planar plate 4, and therewith to vary the rigidity of the lumbar-support device, while displacement of the edge bars 8,9 through mutually equal distances in the same direction results in a change in the vertical setting of the lumbar-support device without altering the rigidity thereof.

The lumbar-support plate 5 is provided on its lower edge bar 9 with a peg 10 which projects into a vertical slot 11 in the planar plate 4 and forms a pivot means for a V-shaped strut 12 having bearing sleeves 13 for receiving a shaft 14, which is also journalled at one end thereof at 15 in the one frame beam 3 so that the shaft 14, in addition to being rotatable about its longitudinal axis, also is able to pivot to a given extent, as illustrated by the positions shown in full lines and chain lines in the FIGURE. The other end of the shaft projects out through a slot 16 in the other beam 3 and carries externally of the back-rest on operating wheel 17. One edge of the slot 16 is provided with a plurality of notches 18 and the shaft 14 is biassed by a leaf spring 19, arranged to hold said shaft pressed in a selected one of the notches 18. Although not shown, the portion thereof abutting the spring 19 may be of hexagonal cross-section, for example, in order to give defined positions and to create a resistance against rotation, so that the shaft is held in the set rigidity position.

The shaft 14 carries between the legs of the V-shaped strut 12 a winding drum 20, to which one end of a line 21 is secured. The other end of the line is secured to the upper edge bar 8 of the lumbar-support plate 5. Rotation of the wheel 17 in one direction will cause the line to be wound onto the drum 20, resulting in downward movement of the upper edge of the plate, so as to cause the plate to bow further forwards, and to increase the rigidity. The vertical setting of the lumbar-support device can be changed at the same time, by pressing the handle 17 backwards and moving it up or down, depending upon whether the lumbar-support device needs raising or lowering. When the wheel is released, the spring 19 urges the shaft 14 into the nearest notch 18, to fix the support in its vertical position. In order to maintain the selected rigidity setting, the shaft may be journalled with sufficient friction to ensure that the force moment created by the bias in the support plate together with the load exerted by the seat occupier on the drum will not normally override the frictional couple. Alternatively, the shaft can be journalled with but small friction and provided with a manually actuable friction brake. A further possibility is to provide the shaft with a non-circular cross-sectional shape over that part thereof which enters a notch 18, so that the shaft can only be rotated when it is moved out of the notch and is locked against rotation when located therein.

As will be understood, further modification can be made to the aforedescribed embodiment within the scope of the invention. For example, the vertical setting of the lumbar-support device can be alternatively effected with the aid of parallel-displaceable shafts 14, by replacing the pivot joint at 15 with a slot arrangement corresponding to the above described. Although with this alternative the distance moved by the shaft ends is shorter than that in the aforedescribed embodiment, it is necessary for the seat occupier to use both hands when changing the vertical setting of the lumbar-support device.

I claim:

1. A vehicle seat having a back-rest having therein a lumbar support device in the form of a horizontally elongated rectangular flexible plate, means mounting the plate for vertical movement as a whole relative to the back-rest and for maintaining the plate in any of a plurality of vertically adjusted positions relative to the back-rest, and means for selectively moving opposite horizontal edges of the plate toward and away from each other thereby to cause the plate to bow forwardly outwardly to a greater or lesser extent.

2. A seat as claimed in claim 1, said means for moving the plate vertically as a whole comprising a shaft interconnected with the plate and having a portion protruding outwardly of the seat and accessible to a passenger to move the shaft to effect said vertical movement of the plate.

3. A seat as claimed in claim 2, and means pivotally mounting the other end of the shaft in the back-rest.

4. A seat as claimed in claim 2, and means adjacent said protruding portion of the shaft for selectively maintaining the shaft in any of a plurality of vertically adjusted positions.

5. A seat as claimed in claim 2, and transmission means interconnecting the shaft and one horizontal edge of the plate whereby upon rotation of the shaft said one horizontal edge of the plate is moved vertically toward or away from the other horizontal edge of the plate.

6. A seat as claimed in claim 5, in which said transmission means comprises a filament wound up on the shaft and having an end connected to said one horizontal edge of said plate.

7. A seat as claimed in claim 6, in which the filament is wound up on the shaft on a drum, and said other horizontal edge of the plate is pivotally connected with a strut having bearings that slide on the shaft on opposite sides of said drum.

* * * * *